C. I. GREER.
APPARATUS FOR CASTING AND BLOWING GLASS BOTTLES AND THE LIKE.
APPLICATION FILED MAY 27, 1912.

1,087,287.

Patented Feb. 17, 1914.

4 SHEETS—SHEET 2.

Attest:
Ewd L. Tolson
R. C. Ourand

Inventor
Charles I. Greer,
by Spear Middleton Donaldson & Spear
Attys.

C. I. GREER.
APPARATUS FOR CASTING AND BLOWING GLASS BOTTLES AND THE LIKE.
APPLICATION FILED MAY 27, 1912.
1,087,287.
Patented Feb. 17, 1914.
4 SHEETS—SHEET 3.
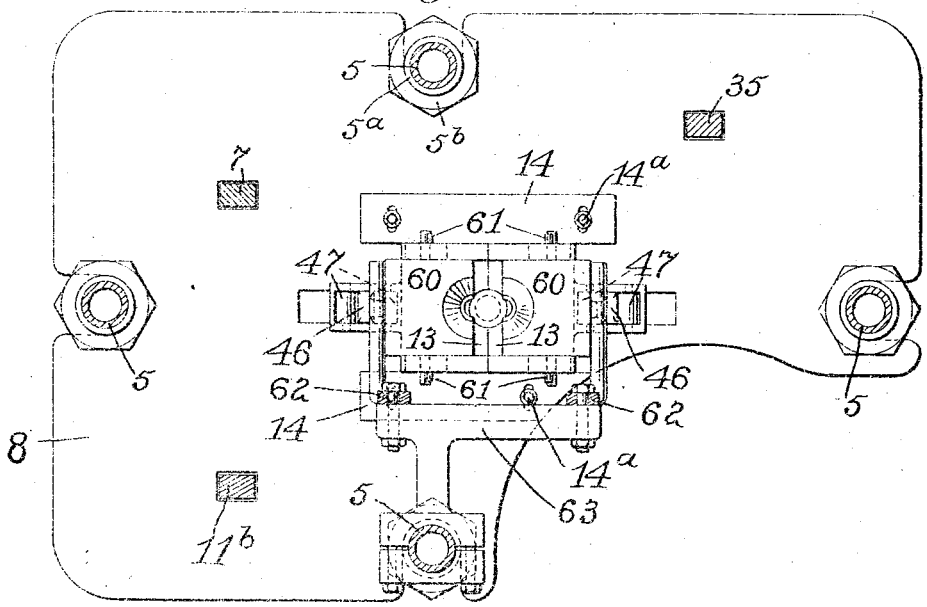
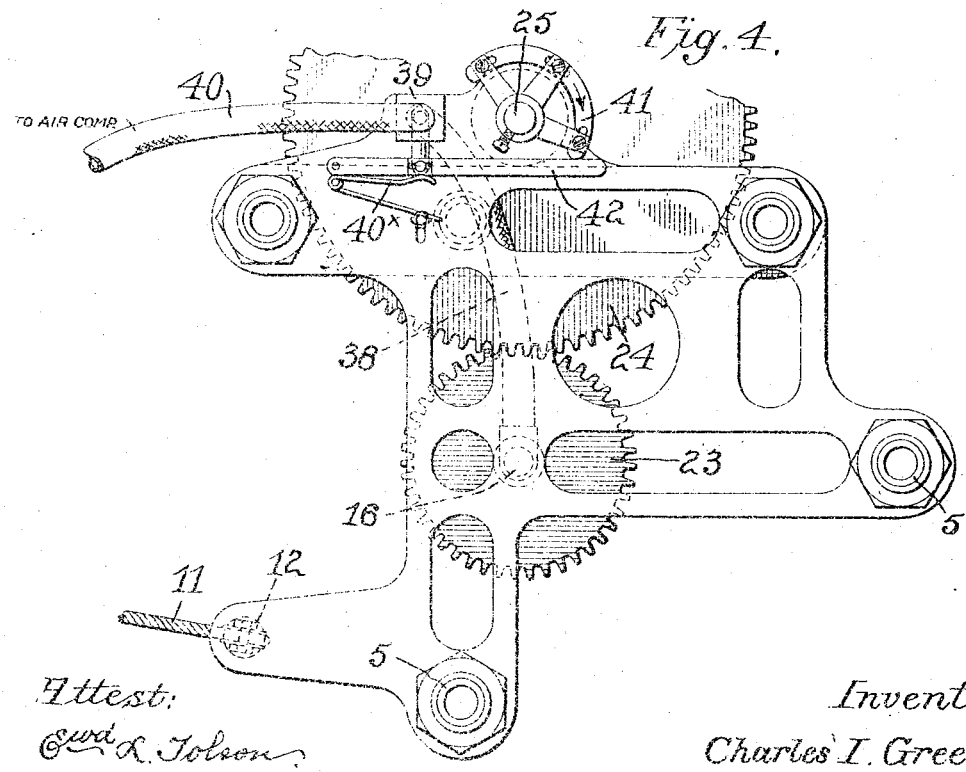
Inventor
Charles I. Greer, C. I. GREER.
APPARATUS FOR CASTING AND BLOWING GLASS BOTTLES AND THE LIKE.
APPLICATION FILED MAY 27, 1912.
1,087,287.
Patented Feb. 17, 1914.
4 SHEETS—SHEET 4.
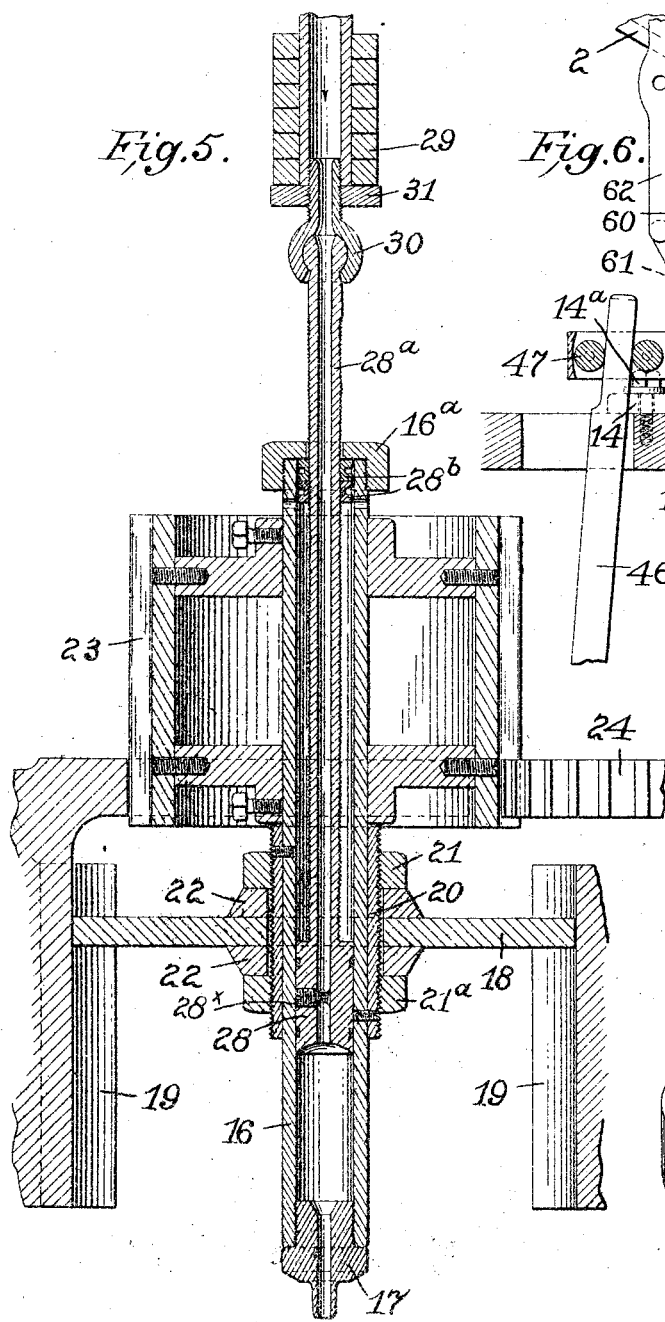
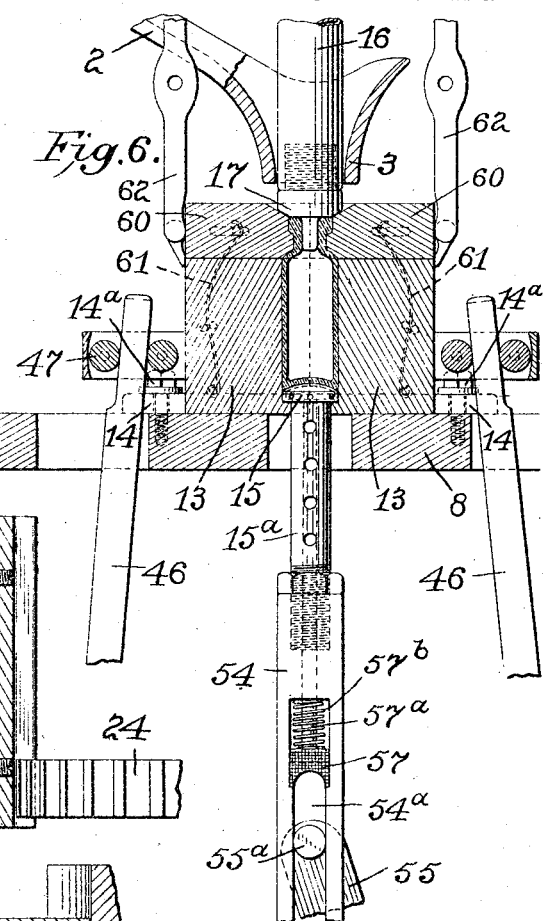
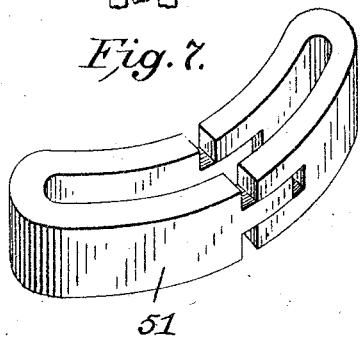
Inventor
Charles I. Greer,

UNITED STATES PATENT OFFICE.

CHARLES I. GREER, OF WASHINGTON, DISTRICT OF COLUMBIA, ASSIGNOR OF ONE-HALF TO ABNER W. CONWAY, OF SALEM, VIRGINIA.

APPARATUS FOR CASTING AND BLOWING GLASS BOTTLES AND THE LIKE.

1,087,287.   Specification of Letters Patent.   Patented Feb. 17, 1914.

Application filed May 27, 1912. Serial No. 699,955.

*To all whom it may concern:*

Be it known that I, CHARLES I. GREER, a citizen of the United States, residing at Washington, District of Columbia, have invented certain new and useful Improvements in Apparatus for Casting and Blowing Glass Bottles and the like, of which the following is a specification.

My present invention relates to improvements in machines or apparatus for casting and blowing glass bottles and similar objects.

I have aimed in devising the present invention to provide an apparatus of extreme simplicity and durability and one capable of being easily adjusted or adapted for the production of bottles of varying sizes and shapes. I have also aimed to produce a machine in which the necessity of air compressors for blowing bottles of ordinary size will be avoided, though it will be adapted to be supplied with air from such a source should the character of the work require.

With these, and other objects in view which will appear from the following specification, the invention includes the novel features of construction and arrangement and combination of parts hereinafter described and particularly defined by the appended claims.

A machine embodying my invention is illustrated in the accompanying drawings in which—

Figure 1:
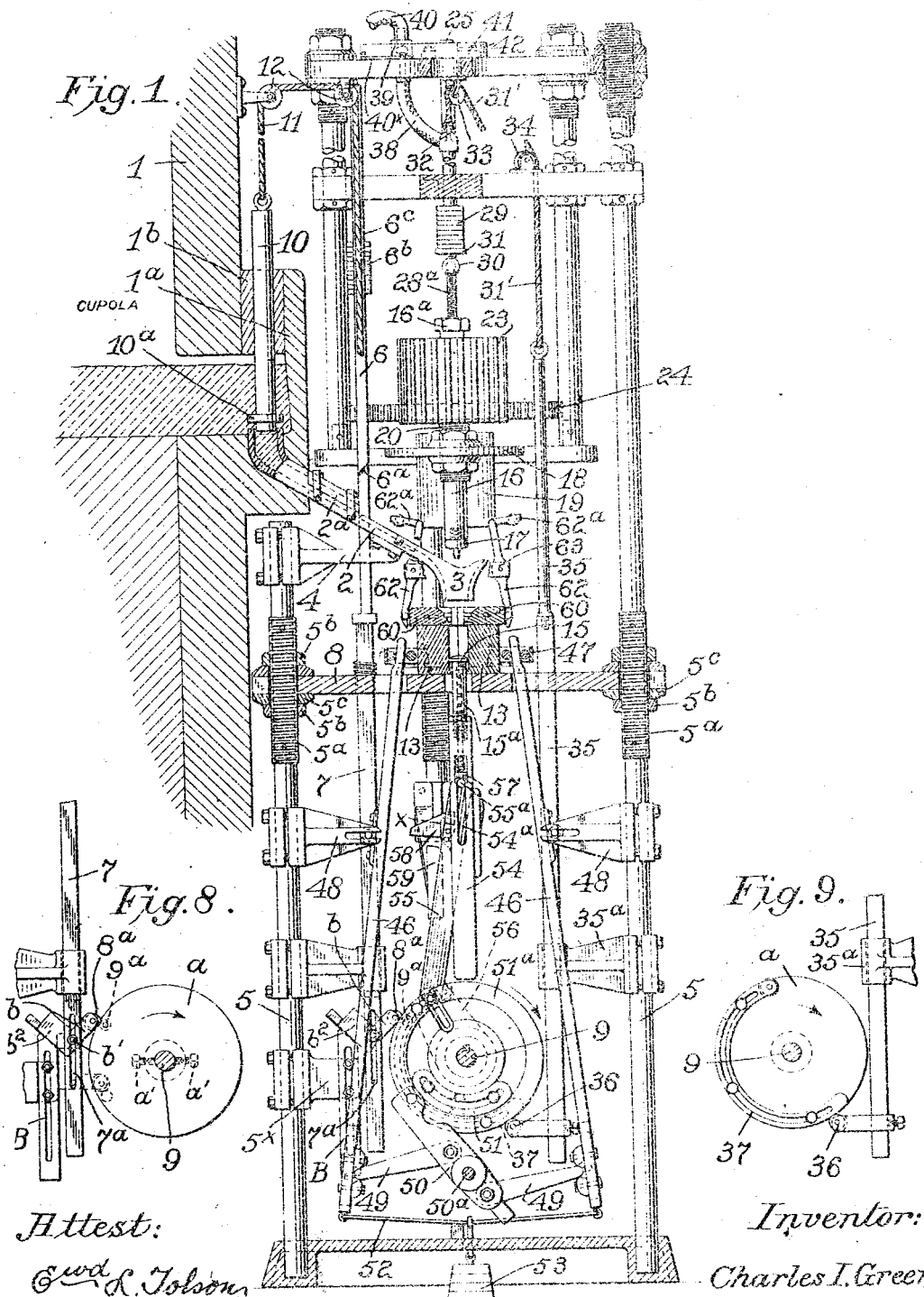
Figures 2, 10, 11:
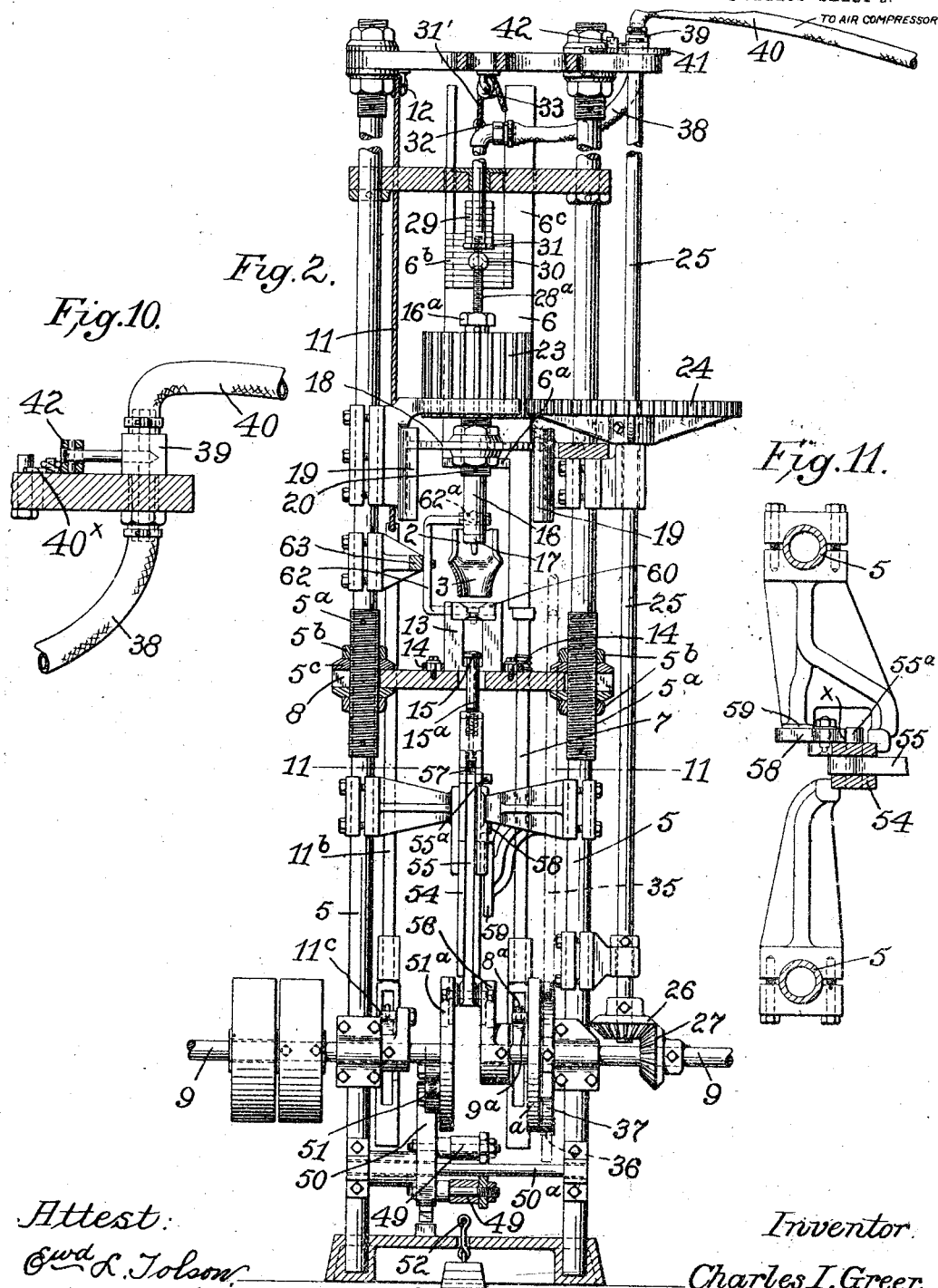

Figure 1 is a sectional elevation, Fig. 2 is a similar view at right angles to Fig. 1, Fig. 3 is a plan view of the table and molds, showing frame parts and plungers in section, Fig. 4 is a detail view of valve operating mechanism, Fig. 5 is an enlarged sectional elevation of the air forcing plunger, and coöperating parts, in raised positions, Fig. 6 is an enlarged sectional elevation of the mold and associated parts, Fig. 7 is a detail view of a preferred form of adjustable cam, Figs. 8 and 9 are detail views illustrating cam actions, Fig. 10 is an enlarged detail illustrating the compressed air supply pipes and controlling valve, and Fig. 11 is a sectional detail, the section being along line 11—11 of Fig. 2.

Referring by reference characters to these drawings the numeral 1 designates a cupola or source of supply of molten glass which may be of the ordinary or any desired construction, and hence is only conventionally shown. From this cupola leads a feed spout or chute 2 which terminates in a funnel shaped member 3 directly over the mold cavity. The spout 2 is supported by an arm 4 adjustably secured to one of the standards 5 of the machine and may be made telescoping or extensible for further adjustment. The flow of the molten glass down this spout is controlled by a vertically movable cut off gate 6 which is operated by a rod or bar 7 passing downward through the mold supporting table 8 and provided with a contact member $8^a$ designed to be operated at the proper time by a contact member $9^a$. The contact member $9^a$ is preferably in the form of a roller carried by the disk $a$ secured to the main shaft 9 in any suitable manner, as for instance by the clamping bolts $a'$, power being imparted to the main shaft in any suitable manner as for instance fast and loose pulleys. The contact member $8^a$ is also preferably a roller which is carried by one arm of a bell crank lever or pawl $b$ which has its pivot pin mounted for vertical adjustment in a slot $7^a$ in the rod 7. The opposite arm $b^2$ of this pawl is designed, when the rod 7 is in its lowest position, and the gate closed, to lie vertically along side of and be held in such position by the guide B, as indicated in dotted lines in Fig. 8. When in this position, the contact of roller $9^a$ causes the bell crank and bar 7 to be raised to open the gate as the bell crank is prevented by the guide from rocking on its pivot until the upper end of the guide is reached, at this point the bell crank lever rocks into the position shown in full lines and allows the contact member $9^a$ to slip past to release the parts without any overthrow which insures the quick closing of the gate. The upper end of the guide is preferably beveled or inclined to form a seat for the rear arm of the bell crank lever. By the adjustments of the pivot of the bell crank lever and the guide, the length of time the gate is to remain open may be varied according to the size of mold used. The gate has an upward extension $6^a$ which carries a plurality of weights by which the gate may be caused to close by gravity with more or less force.

The portion of the chute 2 between the gate and cupola is of closed or tubular form with a portion 2ª removable for cleaning, while the portion below the gate is uncovered. The closed or covered portion terminates in a flat vertical face against which the corresponding flat vertical face of the gate works. The lower edge of the gate is beveled to form a sharp cutting or dividing edge as indicated at 6ª, thus preventing any glass from lodging under the lower edge of the gate.

The delivery chute or spout 2 is preferably connected to an offset portion 1ª of the cupola and within a guideway 1ᵇ thereof is located a plunger 10 which reciprocates in line with the vertically disposed upper end of the chute. The lower end of the plunger is adapted to enter said inner end of the chute when the plunger is down, and the plunger is preferably provided near its lower end with an annular flange 10ª designed to rest upon the upper end or mouth of the chute and effect a tight closure against the flow of any molten glass when the plunger is down. From the plunger a cable or like flexible connecting element 11 passes over pulleys 12 carried by any fixed support or supports, such for instance as the upper part of the cupola and top of the machine frame, whence it leads to a plunger rod 11ᵇ operated by a cam 11ᶜ on the crank shaft in unison with but alternate to the movements of the gate. Thus as the gate is raised the plunger is lowered and tends by its weight to act as a pump piston, forcing the glass into the chute until its flange 10ª closes the mouth of the chute. The molten glass delivered through the chute in the manner hereinbefore described passes through the funnel shaped portion 3 into the bottle shaping cavity between the mold sections 13. These are removably seated upon the table 8 and are movable toward and from each other, being guided in such movement by the guide bars 14 which are adjustably secured to the table by means of bolts 14ª passing through slots in the bars. The table is adjustably supported from the standards 5, preferably by having the standards threaded as indicated at 5ª and provided with upper and lower nuts 5ᵇ with interposed washers 5ᶜ between which the table is clamped. The mold sections 13 are of course together or in closed position at the time the molten glass is being delivered to the mold cavity at which time the movable bottom 15 of the mold is elevated and in the position shown in Figs. 1 and 2. The mold cavity having been filled with molten glass the neck forming and blowing means are then set in operation. These comprise a tubular barrel 16 which is vertically movable toward and from the mold cavity and is provided at its lower end with a nozzle member 17 which is shaped to form the mouth of the bottle and is removable and interchangeable with others of different size or shape to correspond to the character of bottle to be made. The barrel 16 is guided in its vertical movement by the cross head or disk 18 engaging the stationary vertical guides 19, the cross head being preferably adjustably secured to the barrel by means of threaded sleeve 20, fast to the barrel, upper and lower nuts 21 and 21ª and interposed clamping rings 22 between which the cross head is held. In order to properly finish the mouth of the bottle, in one operation, the barrel is given a rotary movement, and this is accomplished by providing it with an elongated sleeve pinion 23 driven by a pinion or gear 24 carried on a vertical shaft 25 driven by bevel gears 26 and 27 from the main shaft 9. Within the barrel is arranged a longitudinally movable piston 28, suitably packed, and having a stem 28ª passing upward through the upper end of the barrel where it is provided with a plurality of weights indicated at 29, the number of which may be varied. A rotary connection (preferably of the ball and socket type) is provided between the piston 28 and the weight carrier 31. The barrel and weighted piston are held elevated during the filling of the mold at which time the stop formed by the nuts 28ᵇ is at the upper end of and sustains the weight of the barrel and its attached gear and cross head. When the portion of the mold above the movable bottom has been filled the weighted stem 28ª is lowered automatically by the rotation of the main shaft in the manner hereinafter explained, the barrel descending with it until the mouth piece 17 rests upon the mold and shapes the bottle mouth. The piston, however, continues to descend, with the result that the air within the barrel beneath the piston is forced out and into the glass to blow the bottle, under a pressure depending upon the number of weights 29 which are used and which would correspond to the size of the bottle being blown, the bore or passage in the piston being closed by means such as plug valve 28ˣ.

In order to regulate the quantity of air which will be forced into the glass the stem 28ª is threaded so that the nuts 28ᵇ may be adjusted upon the stem to, and locked in, any desired position, such nuts when the stem 28ª is held elevated, contacting with the removable cap 16ª at the upper end of the barrel as shown in Fig. 5 and hereinbefore referred to.

The spindle 28 is held elevated and lowered by gravity at the proper time by means of a flexible element such as a cable 31' connected with the weight carrying portion of the spindle at the point indicated at 32, said cable passing over pulleys 33 and 34 and being connected to a vertically movable rod 35 guided in bracket 35ª and having at its lower end a contact member 36 designed to be operated by a cam 37 on the disk a carried by the main shaft which draws said rod down and holds it for the desired interval of time. Said cam is made adjustable so as not only to vary the time of operation but the duration of the intervals.

For work of some kinds it may be desired to supplement the air pressure produced by the piston by compressed air from an extraneous source, and for this purpose I make the spindle and weight carrying portion tubular as shown, and connect the weight carrying member by a flexible pipe 38 with a valve 39 from which a pipe 40 leads to a source of air under pressure. The valve 39 is kept normally closed by a spring 40ˣ as shown in Fig. 4 and is opened at the proper time by a cam 41 acting on pivoted lever 42, said cam being operated by the revolution of the vertical shaft 25 hereinbefore referred to. This cam 41 is made adjustable to vary the time for holding the valve 39 open to suit different conditions. When extraneous air is used valve 28ˣ is open as indicated in Fig. 5.

In order to separate the mold sections after the blowing action is complete I provide levers 46 having their upper ends engaging the mold sections, preferably by passing between antifriction rollers 47 carried by lugs projecting from the mold sections. These levers are fulcrumed upon the adjustable bracket members 48 carried by the standards 5 and are connected at their lower ends by links 49 with a lever 50 fulcrumed at 50ª and designed to be operated by an adjustable cam 51 carried by the disk 51ª mounted on the main shaft. The levers may be operated in a direction reverse to that effected by the cam by having their ends connected by a flexible element such as cable or rope 52 from which is suspended weight 53.

The movable mold bottom 15 is at or near the bottom of the mold during the time the glass is entering it. When, however, the mouth of the mold has been closed by the bottle shaping member 17, the movable bottom is elevated to force the glass upward in the mold to cause it to entirely fill the upper portion around the mouth and neck shaping element. The stem 15ª of the mold bottom is threaded or screwed into the upper end of a reciprocatory bifurcated bar 54 having a slot 54ª within which works a pin 55ª of a pitman 55 connected at its lower end to the crank 56. At the upper end of the slot 54ª is located a movable impact or bearing block 57 having a guiding stem 57ª surrounded by a spring 57ᵇ, the object of which is to cushion the mold bottom on its upward glass forcing stroke so as to cause it to automatically adapt itself to variations in the quantity of glass in the mold.

The slot and pin connection between the elements 54 and 55 is to permit a pause or dwell in the motion of the movable bottom twice on each rotation of the crank shaft. This is accomplished by the coöperation of the dog 58 pivoted to a lug on one arm of bar 54 and which coacts with a guide or abutment 59. This, when the parts are in their lowest position, tilts the dog until its face x comes across the slot and over the pin 55ª and holds said pin in the lower end of the slot.

Referring to Fig. 1 the parts are supposed to be in the position just after the gate has been opened and the glass flowing into the mold. The first action is the closing of the gate by the roller 9ª and 8ª slipping past each other as already described. A moment later the neck and blowing parts are lowered by the end of cam 37 clearing contact 36 and the continued upward movement of the movable mold bottom, due to the further rotation of the crank shaft in the direction of the arrow forces the glass up into the neck of the bottle as above described. After the crank crosses the dead center it lowers the movable bottom until the latter rests in the bottom of the mold during which time the blowing of the bottle is in progress. While the movable bottom is thus resting for a brief period of time at the bottom of the mold to enable the blowing to be completed, the continued rotation of the crank shaft causes the pin to be drawn down to the lower end of the slot, at which moment the dog 58 is thrown over by guide 59 to hold it in said lower end. At this moment the lever 50 is operated to effect the separation of the mold sections and the movable mold bottom is then drawn down through the opening in table 8. As the pitman 55 begins to rise after removal of the finished bottle, said pitman moves the mold bottom up within the mold sections, which then come together, and at this point dog 58, having cleared the guide 59, rocks by gravity into position, shown in Fig. 1, allowing pin 55ª to travel again to the upper end of the slot.

Some bottles have such small necks that the molds do not fill readily with molten glass. To avoid this objection I provide the mold sections with supplemental neck forming sections 60 slidably mounted upon the main sections and normally pressed apart by springs 61. Two levers 62 pivoted upon bracket 63 have their lower ends bearing against opposite sides of said supplemental mold sections and have their upper ends provided with outwardly and upwardly inclined arms 62ª provided with antifriction rollers and adapted to be pressed upon by the disk or head 18 on the downward movement of the latter, by which the supplemental sections are forced together as soon as the molten glass is in the mold.

Having thus described my invention what I claim is—

1. In an apparatus for shaping and blowing glass bottles, a vertically movable barrel having a neck shaping nozzle, a piston within said barrel designed to support said barrel when elevated, and a plurality of removable weights for varying the pressure on said piston, and means for holding said piston elevated and releasing it at the proper time.

2. In an apparatus for shaping and blowing glass bottles, a vertically movable barrel having a neck shaping nozzle, a piston within said barrel designed to support said barrel when elevated, and having a threaded stem projecting through the upper end of the barrel, a member adjustable on said threaded stem within the barrel and designed to abut against the upper end of the barrel, means for applying a varying amount of pressure to said stem, and means for holding said stem elevated and allowing it to drop.

3. In an apparatus for shaping and blowing glass bottles, a vertically movable barrel, means for rotating said barrel without interfering with its vertical movement, a pump piston within the barrel having a stem projecting from the upper end of said barrel and normally sustaining the weight of the barrel, said stem being weighted and adapted to drop by gravity, and means for holding said stem elevated and releasing it at the proper time.

4. In an apparatus for shaping and blowing glass bottles, a vertically movable barrel, a pump piston within the barrel having a hollow stem projecting from the upper end of said barrel and normally sustaining the weight thereof, said stem being weighted and adapted to drop by gravity, a valve for the piston, means for holding said stem elevated and releasing it at the proper time, and auxiliary means for forcing air through said hollow stem.

5. In an apparatus for shaping and blowing glass bottles, a vertically movable barrel, a pump piston within the barrel having a hollow stem projecting from the upper end of said barrel and normally sustaining the weight thereof, said stem being weighted and adapted to drop by gravity, a valve for the piston, means for holding said stem elevated and releasing it at the proper time, a flexible pipe connecting the upper end of said hollow stem with a source of compressed air, and an automatically controlled valve governing the supply of air thereto.

6. In an apparatus of the class described, a vertically movable barrel, a pump piston within the barrel having a hollow stem projecting from the upper end of the barrel, a valve adapted to be set to open or close the passage through said hollow stem, means for effecting vertical movement of the piston within the barrel for causing said piston to act as an air forcing device when the valve is closed and auxiliary means for forcing air through said hollow stem when the valve is open.

In testimony whereof I affix my signature in presence of two witnesses.

CHARLES I. GREER.

Witnesses:
 JAMES M. SPEAR,
 EWD. L. TOLSON.